Sept. 6, 1960

M. F. BAUER 2,951,715

TUBE COUPLING CONNECTION FOR
PLASTIC OR SOFT METAL TUBING

Filed June 30, 1958

INVENTOR.

Matthew F Bauer

BY

United States Patent Office 2,951,715
Patented Sept. 6, 1960

2,951,715
TUBE COUPLING CONNECTION FOR PLASTIC OR SOFT METAL TUBING
Matthew F. Bauer, 16129 Northvale Blvd., East Cleveland 12, Ohio
Filed June 30, 1958, Ser. No. 745,413
2 Claims. (Cl. 285—249)

This application relates to tube coupling connections for connecting a plastic or soft metal tube to a connection body.

This application is a continuation-in-part of my application Serial No. 528,073, filed August 12, 1955, for Tube Coupling Connection, now Patent No. 2,850,303, and said application Serial No. 528,073 is a continuation-in-part of my application Serial No. 410,352, filed February 15, 1954, for Tube Couplings, now abandoned.

In the trade, there is a growing demand for plastic tubing for fluid lines.

An object of this invention is the provision of a tube coupling connection with which plastic or soft metal tubing may be successfully connected.

Another object of this invention is to support the tube internally at its inner axial end but to unsupport it where it is engaged by the contractible sleeve in order to produce a jog in the plastic or soft metal tube to hold same in the fitting.

Another object is to facilitate easy disassembly of the connection.

Other objects and a fuller understanding of my invention may be had by referring to the following description and claims taken in conjunction with the accompanying drawing, in which:

Figure 1:
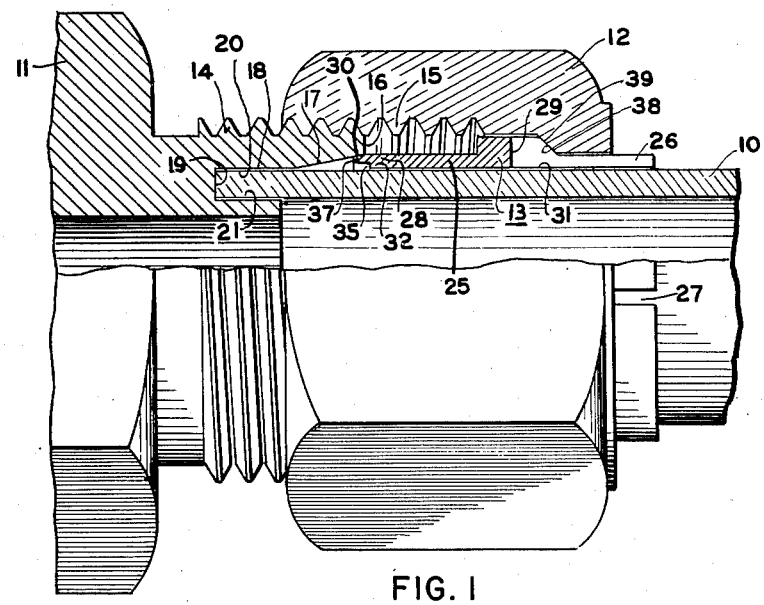
Figure 1 is an enlarged side view of a tube coupling embodying the features of my invention, the upper part being shown in section to illustrate the relationship of parts prior to the time that the nut is tightened, the view being approximately four times scale for a half inch tube.

With reference to Figure 1 of the drawing, the tube connection is preferably made of suitable metal or plastic and comprises generally a coupling or connection body 11, a coupling nut 12, and a contractible sleeve 13 adapted to contractibly engage a plastic or soft metal tube 10. The coupling body 11 is provided at its right-hand end with male threads 14, which are adapted to be threadably engaged by female threads 15 provided in the nut 12 for pressing the sleeve into engagement with the tube. The male threads 14 and the female threads 15 constitute connection means for drawing the connecting body 11 and the coupling nut 12 toward each other. As illustrated, the connection body 11 is provided with a laterally extending outer wall or an entrance end portion 16 with substantially a conical opening or outer cam wall 17 extending into said body from said outer wall 16. The conical opening 17 receives the sleeve 13 and the end of the tube 10. Extending longitudinally beyond the inwardly converging cam surface 17 is a socket or annular walled counterbore 18 which is provided with a terminating end surface 19. The taper of the inwardly converging cam surface 17 may be preferably about nine degrees and preferably may lie in a range of approximately eight to twelve degrees, but may be in a wider range of approximately seven to twenty degrees, measured with respect to the longitudinal axis of the tube.

The annular walled counterbore 18 has an outer side wall 20 and an inner side wall 21 both extending substantially parallel relative to the longitudinal axis of the connection body to receive the end of the tube. The end of the tube fits easily in the counterbore.

The sleeve 13 has a bore 31 adapted to surround the tube and comprises a continuous annular body 25 provided with rearwardly extending segmental fingers 26 which grip the tube when the nut is tightened.

In the manufacturing of the sleeve, the fingers 26 are provided by making slots 27 in the rearward section thereof at annularly spaced intervals thereabout. In Figure 1, four slots are used, but any number may be used. The continuous annular body 25 has a leading or forward contractible end portion 28 and a rearward end portion 29. As illustrated, the end portion 29 constitutes the forward terminus for the slots 27. The leading or forward contractible end portion 28 has at its forward end a cam surface 30 which engages the inwardly converging camming surface 17 of the connection body 11. The inside surface of the leading or forward contractible end portion 28 of the sleeve is preferably about the same diameter as the bore 31 of the sleeve. The rib or step 32 is provided with forward edge 35 which constitutes a biting edge for biting into the tube.

The forward edge 35 constitutes laterally extending circumferential wall terminating in circumferential cutting edge to bite and make its own grooves into the outside surface of the tube. The forward edge 35 of the rib 32 faces the counterbore 18.

The axial outer ends of said outer cam wall 17 and said inner wall 21 have respectively diameters at least equal to the outside diameter of the axial inner end of said contractible end portion of said sleeve and no greater than the diameter of the inside surface of said tube. The cam wall 17 at its axial inner end thereof has a diameter that is closer to that of the outside surface of the inserted tube than to that of the outside surface of the axial inner end of said contractible end portion of the sleeve. The outer cam wall 17 is axially longer than the inner wall 21 whereby with said tube engaging the axial inner end 19 of the counterbore 18, the axial inner end of said contractible end portion of said sleeve will engage the cam wall at an initial contact place axially spaced outwardly from the axial outer end of said counterbore. The cam wall between the initial contact place and the axial inner end thereof slopes to define an acute angle at substantially all places therealong with respect to the longitudinal axis of the tube. The inner axial end of said cam wall terminates substantially axially co-terminus with said outer axial end of the inner wall 21 of the counterbore.

The portion of the sleeve in advance of the major rib or step 32 constitutes an auxiliary body or shell 37. This shell functions to support the outside wall of the tube in advance of the major rib or step 32. The intermediate part of the entire sleeve, that is, the rearward end of the continuous annular body 25 and the forward end of the segmental fingers 26 is enlarged to provide a tapered or cam shoulder 38 against which a cam shoulder 39 of the nut engages for pressing the contractible sleeve into the inwardly converging cam surface 17 of the connection body 11. The tightening of the nut against the cam shoulder 38 of the sleeve contracts the segmental fingers about the tube for supporting the tube against vibration. It is to be noted that the cam shoulder 39 on the nut oppositely faces the converging cam surface 17 and the counterbore 18.

In assembly, as the sleeve is pressed forward by the tightening of the nut, the outer annular cam surface 30 of the sleeve forcibly engages the inwardly converging cam surface 17 of the connection body and thereby produces a camming action which cams or deflects the leading or forward contractible end portion 28 of the sleeve against the tube axially outwardly of the outer end of the inner wall 21 of the counterbore and thereby collapses the tube and provides a jog in the tube between the contractible end portion of the sleeve and the outer axial end of the inner wall 21 of the counterbore. The camming action embeds the rib or step 32 into the tube and holds the tube in the fitting.

As the forward contractible end portion 28 of the sleeve cams against the outside surface of the tube, there is a tendency for the camming action to collapse the plastic or soft metal tubing and make the jog to provide a good fluid seal.

Figure 2:
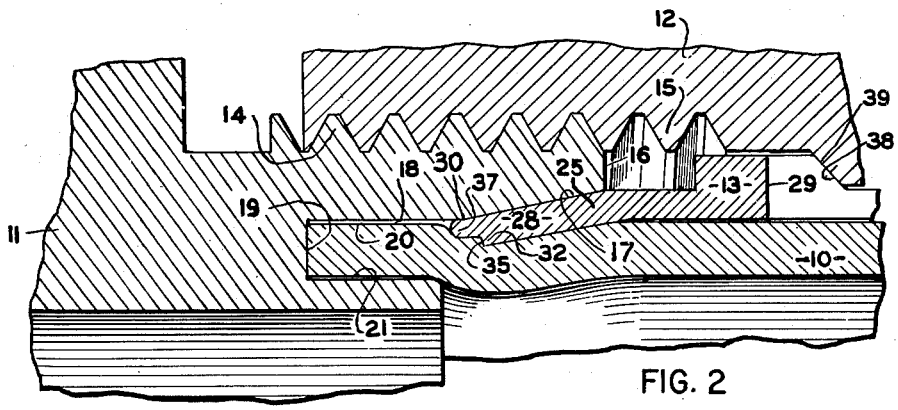
Figure 2 is an enlarged and fragmentary cross-sectional view of the forward end portion of the sleeve shown in Figure 1, the view being approximately eight times scale.
Figure 3:
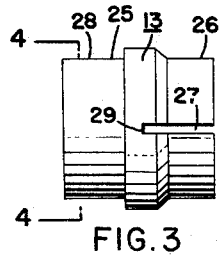
Figure 3 is a side view of the sleeve only, the view being approximately two times scale for a half in. tube.
Figure 4:
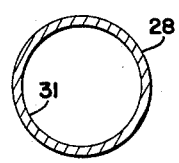
Figure 4 is a cross-sectional view of the sleeve taken along the line 4—4 thereof.

The tube 10 has an unsupported inside surface portion within the axial extent of the sleeve. The inner axial end of the cam wall 17 and the thickness of the sleeve are so related that the circumferential edge 35 of the sleeve, upon assembly of the sleeve in the cam wall 17, terminates substantially axially co-terminus with the outer axial end of the inner wall 21 of the counterbore. When assembling the coupling connection by the tightening of the nut 12, the contractible end portion 28 of the sleeve is cammed against the cam wall 17 which in turn cams the circumferential edge 35 of the sleeve against the outside surface of the tube 10 which is opposite the unsupported portion of the tube and radially deforms both the inside and the outside surface of the tube to make the jog or deformation, as shown in Figure 2. The inside deformation or the inside surface of the jog forms a substantially smooth curve extending from the outer end of the inner annular side wall 21 of the counterbore and terminates within the sleeve. The outside surface of the tube assumes substantially the shape of the contractible end portion of the sleeve. The inside and outside diameters of the tube at the inner end of the counterbore are substantially unchanged from the original inside and outside diameters of the tube upon completion of the assembly of the coupling connection.

The coupling may be assembled and disassembled an unlimited number of times because upon each assembly, the joined parts assume the position of their previous setting. The forward end of the tube slides on and off the inner side wall 21 of the counterbore with ease upon assembly and disassembly.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:
1. A coupling connection between a connection body having a flow bore and a tube having a substantially uniform wall thickness and having an inside and an outside annular surface, a sleeve having a bore with said tube extending therethrough, said sleeve having a peripherally continuous contractible end portion, said tube having an end portion extending beyond the contractible end portion of said sleeve, said contractible end portion of said sleeve having an annular inside and outside surface and circumferential wall means extending in a generally radially inwardly direction and terminating in a circumferential edge at the axial inner end portion of the sleeve capable of deforming the said tube, said connection body having an axially directed annular walled chamber having outer and inner side walls defining substantially an annular counterbore to loosely receive the end portion of the tube without deformation of said tube, said counterbore having a radial distance between the side walls thereof which is greater than the radial distance between the inside and outside surfaces of said tube, said connection body having an outer cam wall joined with and extending radially outwardly and axially away from said outer side wall of said counterbore to receive the contractible end portion of said sleeve, the axial outer ends of said outer cam wall and said inner wall of said counterbore having respectively diameters at least equal to the outside diameter of the axial inner end of said contractible end portion of said sleeve and no greater than the diameter of the inside surface of said tube, said inner side wall supporting said end portion of the tube, said tube having an unsupported inside surface portion within the axial extent of said sleeve, the inner axial end of said cam wall and the thickness of said sleeve being so related that said circumferential edge of said sleeve upon assembly of said sleeve in said cam wall terminates substantially axially co-terminus with said outer axial end of said inner wall of said counterbore, forcing means engaging said sleeve axially outwardly of said circumferential edge for forcing the outside surface of said contractible end portion of said sleeve against the cam wall and camming the circumferential edge of said sleeve against said outside surface of said tube which is opposite said unsupported portion of the tube and radially deforming both the inside and outside surfaces thereof, said inside deformation forming a substantially smooth curve extending from the outer edge of said inner side wall of said counterbore and terminating within said sleeve, said outside surface of said tube assuming substantially the shape of the contractible end portion of said sleeve, the inside and outside diameters of said tube at the inner end of said counterbore being unchanged from the original inside and outside diameters of the tube upon completion of the assembly of the coupling connection.

2. The device set forth in claim 1, wherein said relationship of said cam wall and said sleeve is determined by the positioning of the inner axial end of said cam wall.

References Cited in the file of this patent
UNITED STATES PATENTS

| | | |
|---|---|---|
| 2,152,537 | Couty | Mar. 28, 1939 |
| 2,365,747 | Cowles | Dec. 26, 1944 |
| 2,698,191 | Samiran | Dec. 28, 1954 |
| 2,761,704 | Crawford | Sept. 4, 1956 |
| 2,768,845 | Samiran | Oct. 30, 1956 |
| 2,850,303 | Bauer | Sept. 2, 1958 |